United States Patent [19]
Mayne et al.

[11] Patent Number: 5,344,115
[45] Date of Patent: Sep. 6, 1994

[54] CLAMPING AND HOLDING DEVICE

[75] Inventors: Richard C. Mayne; Laurence Gray; Richard Whyte, all of Kingston, Canada

[73] Assignee: Manova Products Inc., Kingston, Canada

[21] Appl. No.: 988,210

[22] Filed: Dec. 9, 1992

[30] Foreign Application Priority Data

Aug. 14, 1992 [CA] Canada ............................ 2,076,202-1

[51] Int. Cl.5 ............................................ A47G 25/12
[52] U.S. Cl. .................................. 248/514; 248/534;
248/225.31; 248/231.5; 248/314; 403/104
[58] Field of Search ............... 248/534, 231.5, 225.31,
248/291, 309.1, 314, 514; 24/489, 499, 503;
403/104, 106

[56] References Cited

U.S. PATENT DOCUMENTS

| | | | |
|---|---|---|---|
| 595,218 | 12/1897 | Stauffer | 248/314 |
| 1,062,460 | 5/1913 | Haman | 248/225.31 |
| 1,525,515 | 2/1925 | Socha | 248/291 X |
| 1,995,656 | 3/1935 | Stout | 248/291 |
| 2,093,951 | 9/1937 | Bosket . | |
| 2,678,792 | 5/1954 | Gallion et al. | 248/225.31 |
| 2,884,213 | 4/1959 | Hiering . | |
| 2,905,413 | 9/1959 | Harris . | |
| 2,955,793 | 10/1960 | Finley | 248/225.31 |
| 2,994,366 | 8/1961 | Hoch | 248/225.31 X |
| 3,140,069 | 7/1964 | McBurney et al. . | |
| 3,734,439 | 5/1973 | Wintz | 248/225.31 X |
| 3,792,829 | 2/1974 | Fickett . | |
| 4,832,299 | 5/1989 | Gorton et al. | 248/291 X |
| 4,852,841 | 8/1989 | Sebring . | |
| 4,871,141 | 10/1989 | Chen | 248/534 |
| 4,901,970 | 2/1990 | Moss et al. | 248/534 X |

FOREIGN PATENT DOCUMENTS 1279860 11/1986 Canada .
1282681 3/1987 Canada .

OTHER PUBLICATIONS

Good Housekeeping, Jan., 1993 "Over-the-Arm Chair Tray", anon.

Primary Examiner—David A. Scherbel
Assistant Examiner—Derek J. Berger
Attorney, Agent, or Firm—Robert M. Phipps

[57] ABSTRACT

This invention relates to a clamping device and more particularly to a clamping device which can be attached to articles such as patio chairs to mount a holder for umbrellas and the like in a variety of positions. The device comprises a main body including a barrel and a first clamping arm extending laterally in one direction from one end of said barrel, a second clamping arm pivotally mounted at the other end of said barrel and adapted to cooperate with the first clamping arm to engage an article upon which the clamping device is to be mounted, a holder extending laterally from said one end of said barrel in a direction other than said one direction, means for mounting said holder on said barrel to provide a position permitting pivotal movement and a position in which the holder is locked, spring means within the barrel acting to bias the mounting means to a locked position while permitting movement of the mounting means to the position permitting pivotal movement.

9 Claims, 7 Drawing Sheets

CLAMPING AND HOLDING DEVICE

FIELD OF THE INVENTION

This invention relates to a clamping device and more particularly to a clamping device which can be attached to articles such as patio chairs to mount a holder for umbrellas and the like in a variety of positions.

BACKGROUND OF THE INVENTION

In the past, there has been a need for a device that conveniently and securely attaches to patio or deck furniture for mounting a variety of accessories, including trays, sunshades and umbrellas. The user of patio or deck furniture, such as chairs or tables usually has need of additional accessories. For example, a person sitting on a patio or deck chair could have need of a tray conveniently located on the chair for placing food or beverages or for an umbrella or sunshade to provide shade from the sun. Modern patio or deck furniture is often designed to stack upon themselves for storage and, therefore, any accessories used with the furniture should be readily removeable so as not to interfere with such abilities.

Clamps in the past have not provided an effective and convenient means of attaching these various accessories to patio or deck furniture.

Canadian Patent 1,279,860 discloses a spring biased cam-type medical accessory post clamp for mounting a housing on an elongated supporting member. It does not permit attachment to the variety of surfaces as are found on patio or deck furniture.

Canadian Patent 1,282,681 discloses a latching assembly for releasably attaching a vehicle seat to a vehicle body. This device, similarly, does not permit attachment to the variety of surfaces found on patio or deck furniture.

U.S. Pat. No. 4,852,841 discloses a device for clamping the edge of a table. The clamping action of this device is actuated by a lever which serves to move a clamping surface closer to a second clamping surface. This device, similarily, does not permit attachment to the variety of surfaces found on patio or deck furniture.

Other patents of interest relating to clamping devices are U.S. Pat. No. 2,093,951, U.S. Pat. No. 2,905,413, U.S. Pat. No. 2,884,213, U.S. Pat. No. 3,140,069, and U.S. Pat. No. 3,792,829.

It is, therefore, an object of this invention is to provide a holder of the type described which is convenient to use and which will securely hold the umbrella or other article in the holder in a variety of positions. It is of particular importance that the holder be held firmly when the umbrella or similar article is inclined because of the leverage exerted when the umbrella is not in a vertical position.

It is also an objective to provide a clamping device which can easily and conveniently be attached to an article of furniture such as patio furniture and in which the angle of inclination of the holder can also readily be adjusted.

SUMMARY OF THE INVENTION

In accordance with one aspect of this invention, there is provided a clamping device comprising a main body including a barrel and a first clamping arm extending laterally in one direction from one end of said barrel, a second clamping arm pivotally mounted at the other end of said barrel and adapted to cooperate with the first clamping arm to engage an article upon which the clamping device is to be mounted, a holder extending laterally from said one end of said barrel in a direction other than said one direction, means for mounting said holder on said barrel to provide a position permitting pivotal movement and a position in which the holder is locked, spring means within the barrel acting to bias the mounting means to a locked position while permitting movement of the mounting means to the position permitting pivotal movement.

In accordance with a preferred aspect of this invention, a cam follower is at said other end of the barrel and a cam is on the second clamping arm to cooperate with the cam follower to bias the second clamping arm to closed position.

It is also preferred that said spring means bears on the cam follower to urge it against the cam.

It is furthermore preferred that locking teeth on the holder engage locking teeth in said main body to provide said position in which the holder is locked.

In accordance with another aspect of this invention, a clamping device is provided including a first section having clamping jaws for engaging an article at one end of the device and a second section including a holder means for mounting said second section on the first section to provide a first position permitting pivotal movement of the holder and a second position in which locking teeth on each of the first and second sections are engaged to prevent said pivotal movement and means for normally securing second section to the first section in said second position.

BRIEF DESCRIPTION OF THE DRAWINGS

In the drawings which illustrate the preferred embodiment of this invention.

DETAILED DESCRIPTION OF THE PREFERRED EMBODIMENT

Figure 1:
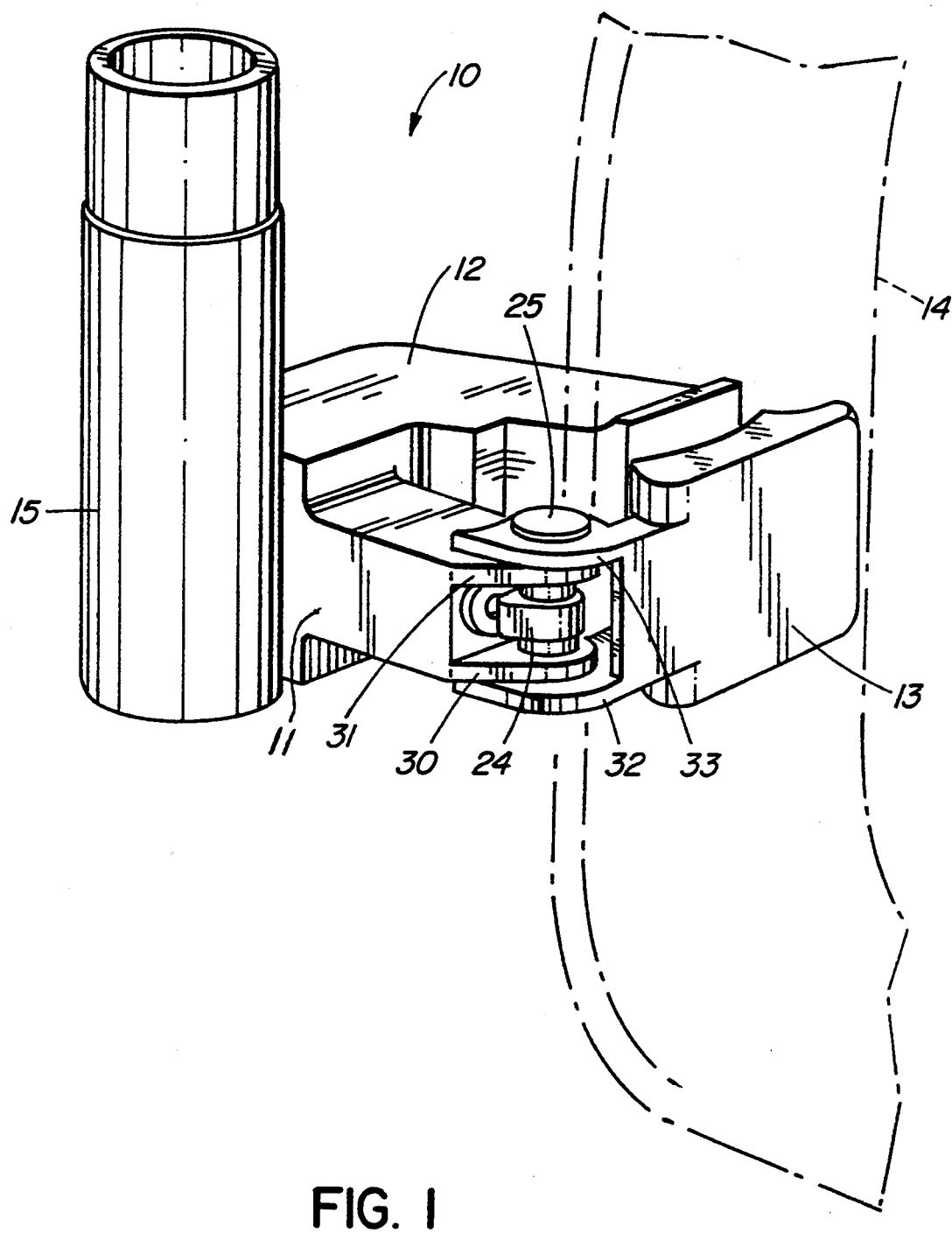
FIG. 1 is a perspective view of a clamping device in accordance with this invention.

Referring now to the drawings FIG. 1 illustrates a clamping device comprising a main body 10 including a barrel 11 and a first clamping arm 12 extending laterally in one direction from one end of the barrel. A second clamping arm 13 is pivotally mounted at the other end of barrel 11. Clamping arms 12 and 13 cooperate to engage an article upon which the clamping device is to be mounted, such as for example, a section of an arm of a lawn chair illustrated at 14 in FIGS. 5 and in FIG. 1.

Figure 2:
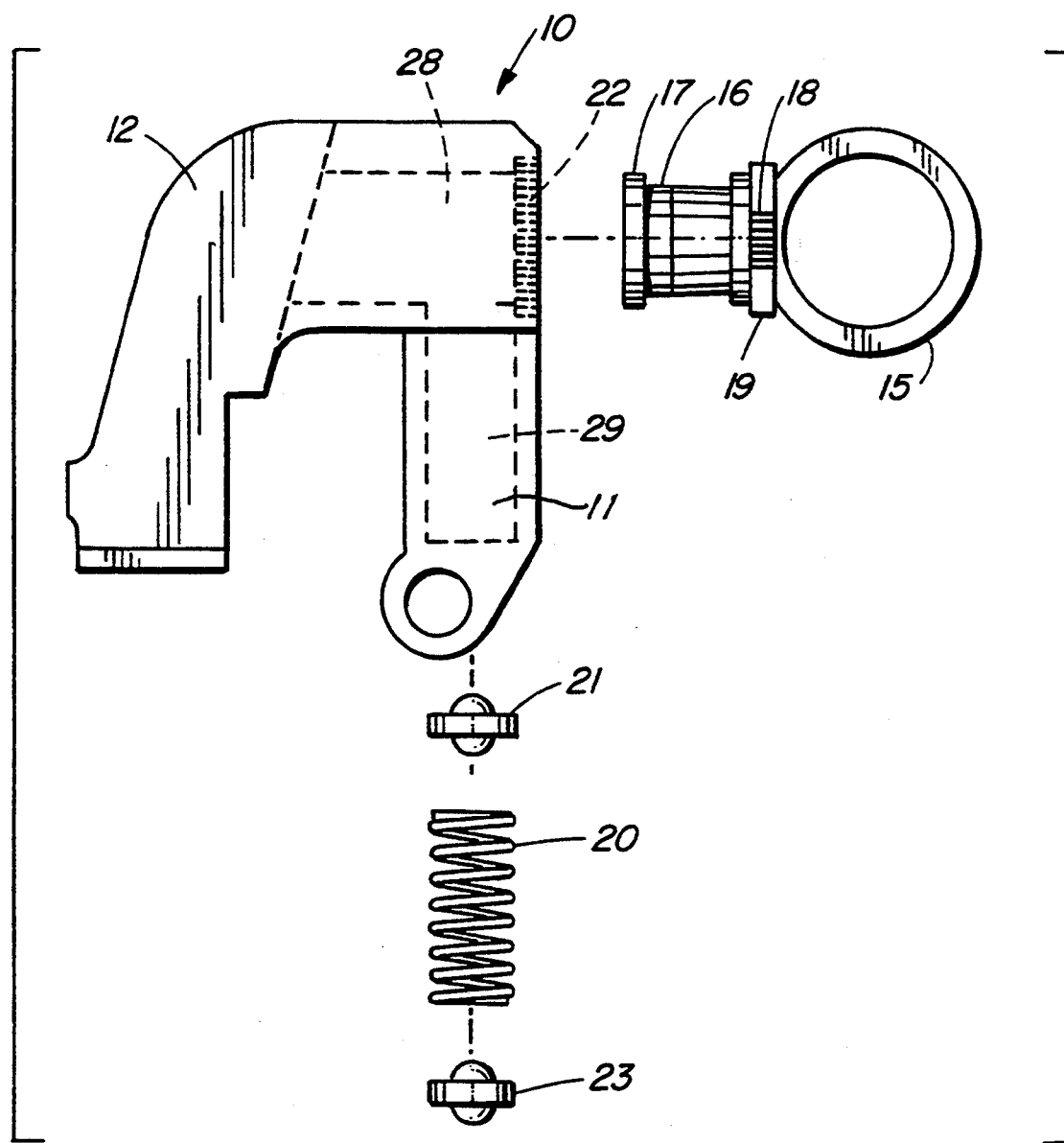
FIG. 2 is an exploded plan view of part of the clamping device of FIG. 1.
Figure 5:
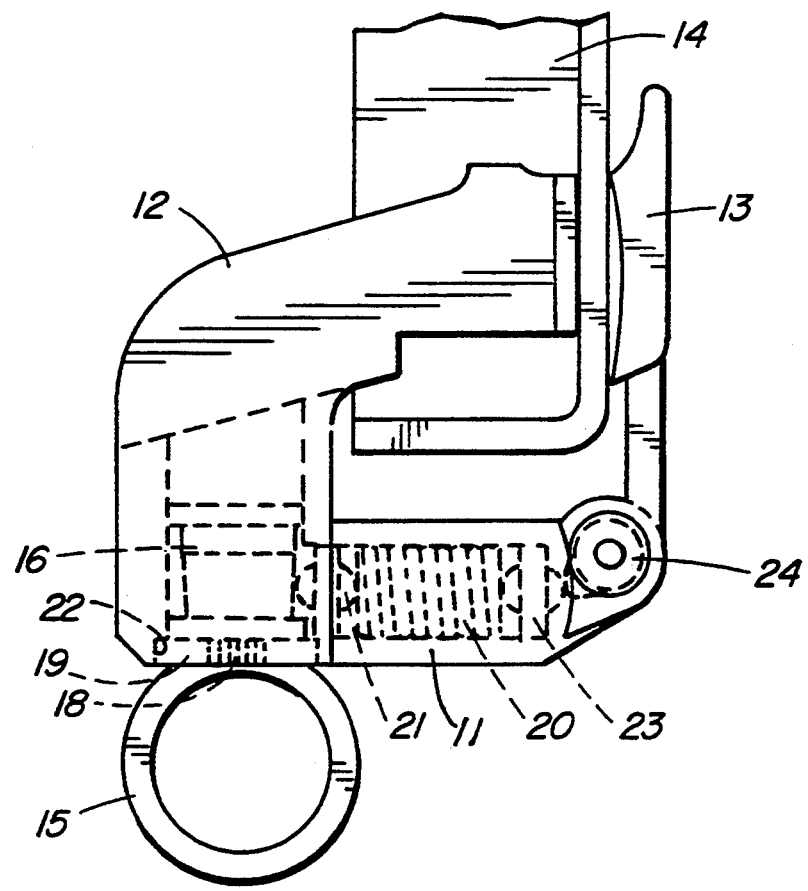
FIG. 5 is a plan view of the clamping device in accordance with FIG. 1.

A holder 15 which may be in form of a tube with an interior diameter of about one inch is mounted on barrel 11 to extend laterally in a direction opposite to the extension of clamping arm 12. As shown in FIG. 2, holder 15 is mounted for pivotal movement about a horizontal axis transverse to the central axis of barrel 11. Holder 15 has a mounting portion 16 which is conical with the smaller diameter close to holder 15. A retaining lip 17 is at the far end of mounting 16 to prevent it from being fully retracted from the main body 10. A serrated collar 18 is also provided having teeth 19 to permit the holder to be locked firmly in position at a variety of different angles. Upon assembly of holder 15 with main body 10 as shown in FIG. 5 a compress ion spring 20 urges locking button 21 against conically shaped mounting 16 to urge teeth 19 into engagement with teeth 22 in main body 10. This structure provides a firm engagement between the holder 15 and the main body 10 at a variety of positions. However, the angular position of holder 15 can readily be adjusted by pulling holder 15 out in a downward direction with respect to FIG. 5 to disengage teeth 19 and 22 and permit pivotal rotation.

Figure 3:
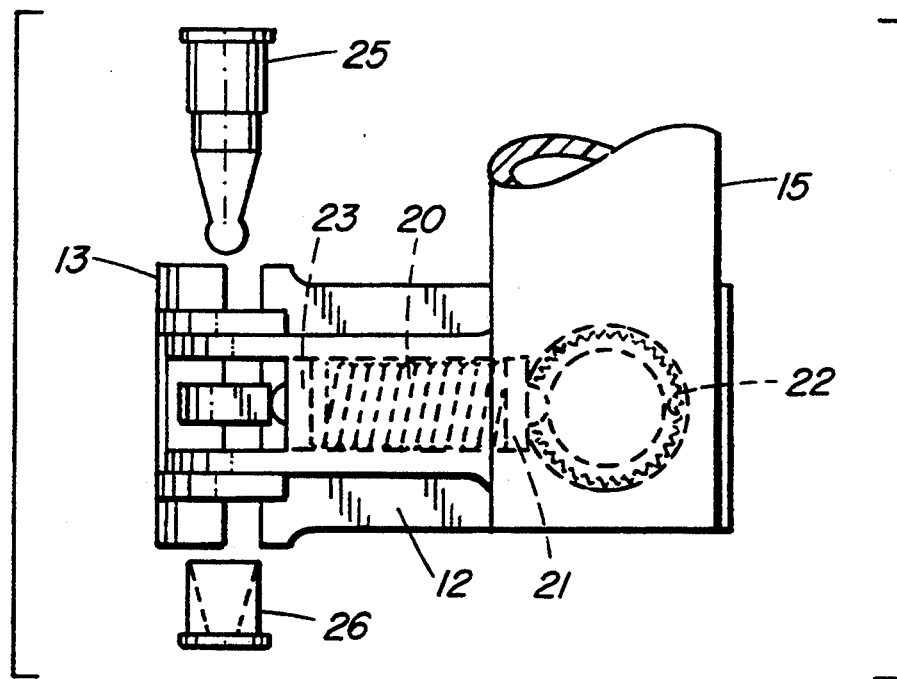
FIG. 3 is an exploded end elevation view of the clamping device in FIG. 1.
Figure 4:
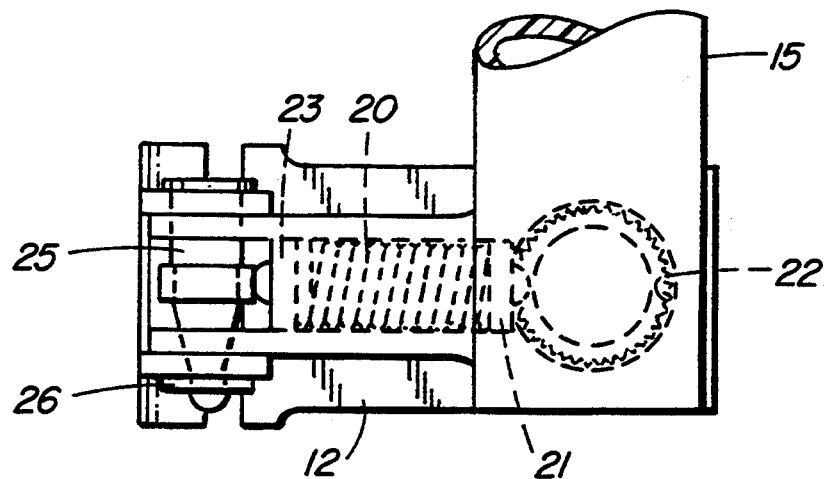
FIG. 4 is an elevation view corresponding to FIG. 3 but showing the components assembled.

A locking button 23 is also controlled by spring 20 and it provides a cam follower for engagement with a cam 24 shown in FIG. 5. Cam 24 is secured in position within clamping arm 13 by pin 25 which engages locking button 26 as shown in FIGS. 3 and 4. The interaction of cam 24 and cam follower 23 causes clamping arm 13 to be biased into closed position to hold the article of furniture such as 14 between the clamping arms. Assembly is achieved in accordance with the following:

1. Insert holder 15 into a hole 28 in body 10;
2) Insert locking button 21 into the bore 29 of barrel 11;
3) Insert spring 20 into barrel 11 ensuring that it seats over locking button 21;
4) Insert locking button 23 into bore 29 ensuring that the button 23 seats into spring 20;
5) Position clamping arm 13 over projecting legs 30 and 31 in body 11 and slide pin 24 through the arms 32 and 33 of clamp 13 and one leg 31 of body 11 and cam 24 ensuring that the cam face is in alignment with locking button 23;
6) Position locking cap 26 through arm 32 of clamp arm 13 and bottom leg 30 of body 11, pressing pin 25 and locking cap 26 together until the pin locks into the locking cap.

Figure 6:
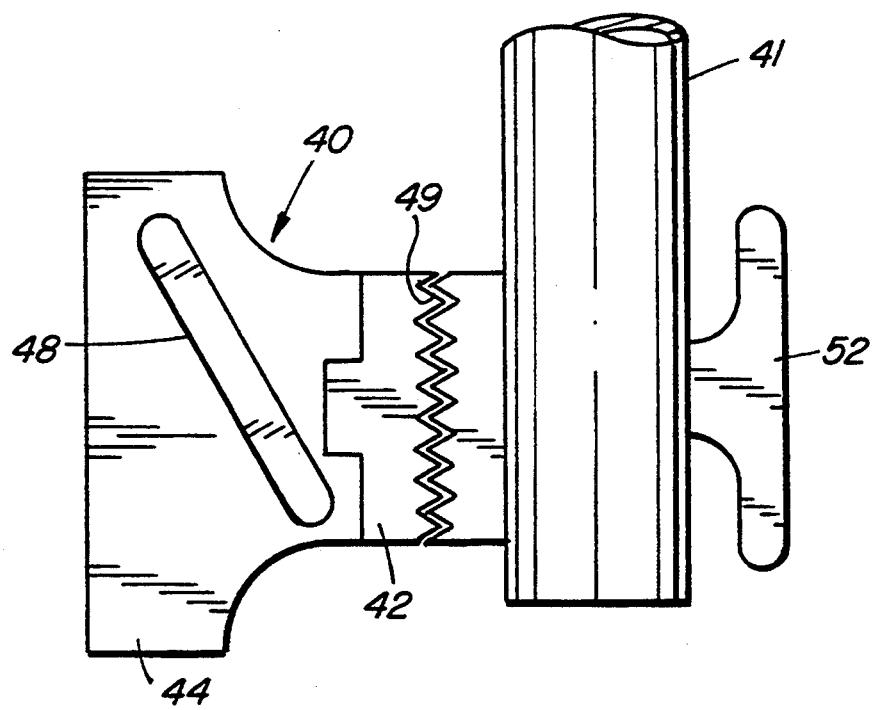
FIG. 6 is a side elevation view of a clamping device in accordance with an alternative embodiment.
Figure 7:
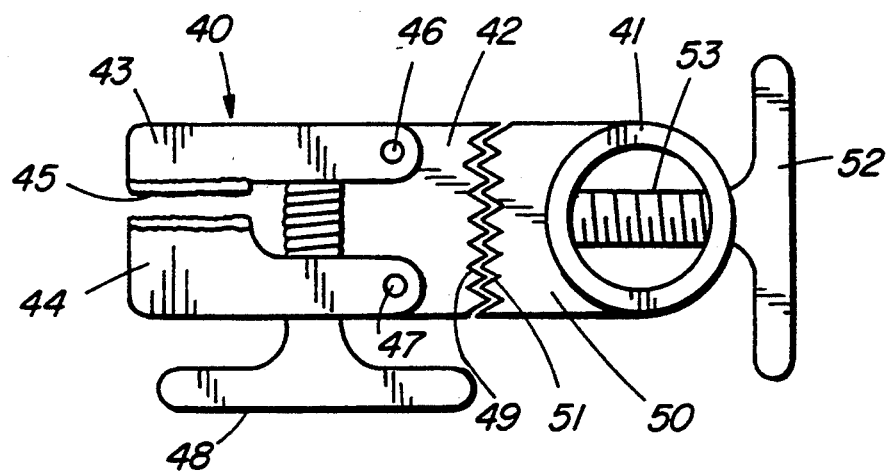
FIG. 7 is an plan view of the device of FIG. 8.

FIGS. 6 and 7 illustrate an alternative embodiment of this invention in which there are two sections. The first section 40 is as clamping section and the second section 41 is a holding section. The clamping section comprises a body 42 to which is pivotally secured jaws 43 and 44 which preferably are faced with rubber or similar material as shown at 45. Pivot pins 46 and 47 permit the jaws to pivot. A wing nut 48 threadably engages jaws 43 and 44 to clamp the device to an article of furniture. The first section also comprises serrated teeth 49.

Figure 8A:
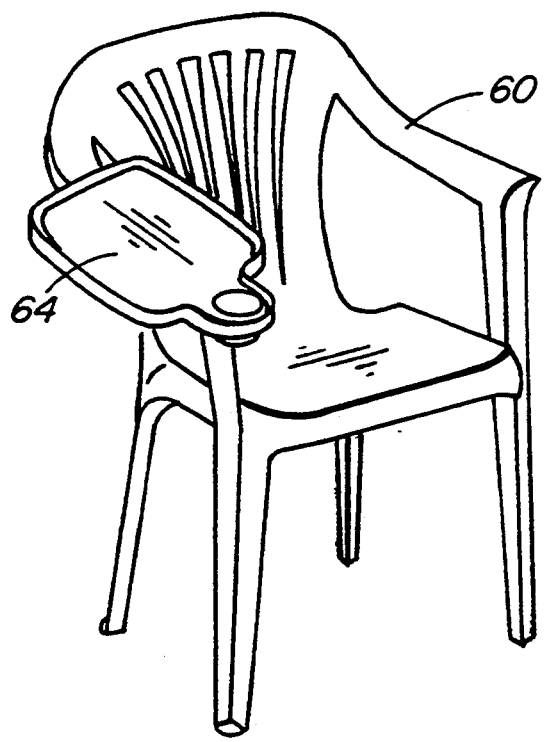
FIG. 8a is a perspective view of a tray mounted on a chair by a clamp in accordance with the invention.
Figure 8C:
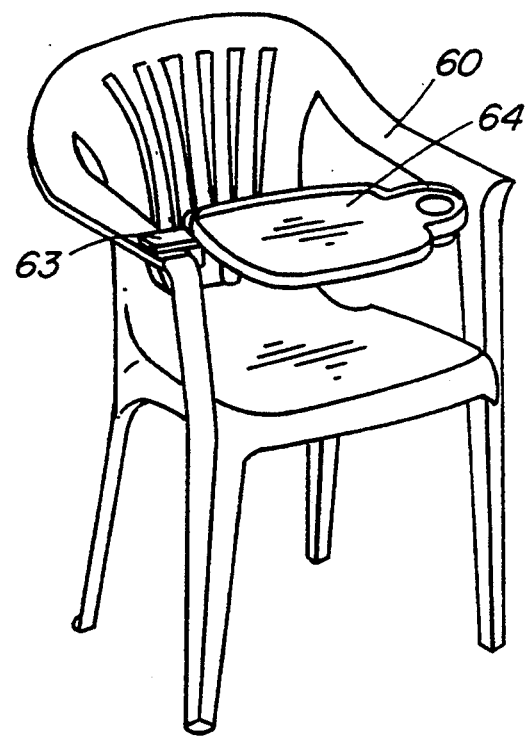
FIG. 8c is a perspective view of a tray mounted on a chair in a different orientation to that of FIG. 8a in accordance with the invention.
Figure 8B:
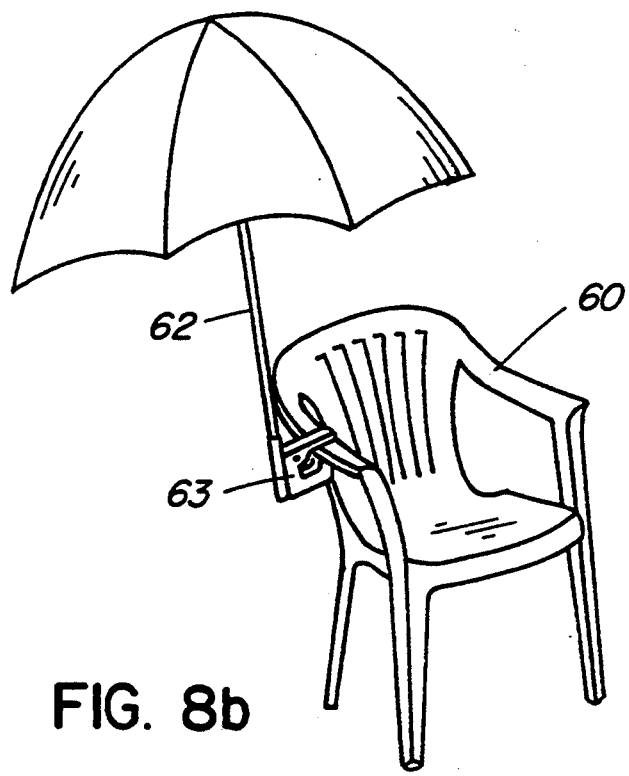
FIG. 8b is a perspective view of an umbrella mounted on a chair by a clamp in accordance with the invention.
Figure 8D:
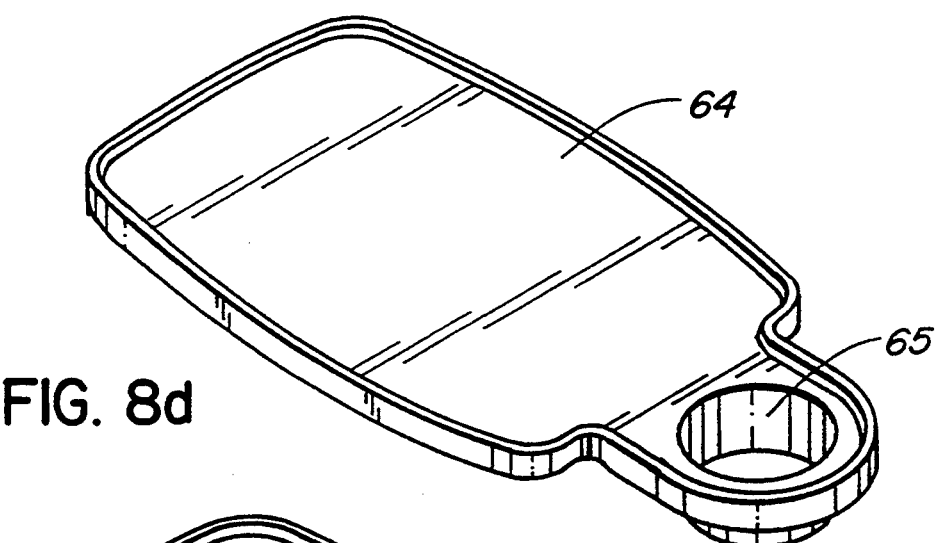
FIG. 8d is a perspective view of the top side of a tray in accordance with the invention.
Figure 8E:
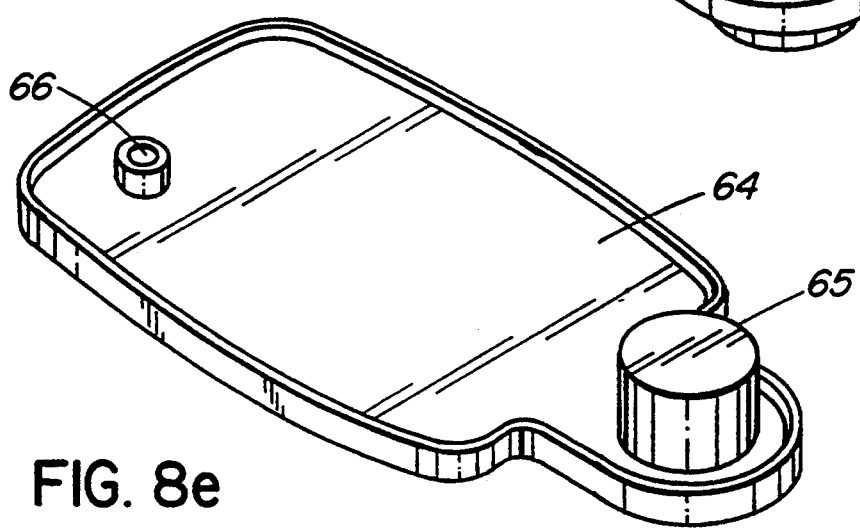
FIG. 8e is a perspective view of the underside of a tray in accordance with the invention.
Figure 8F:
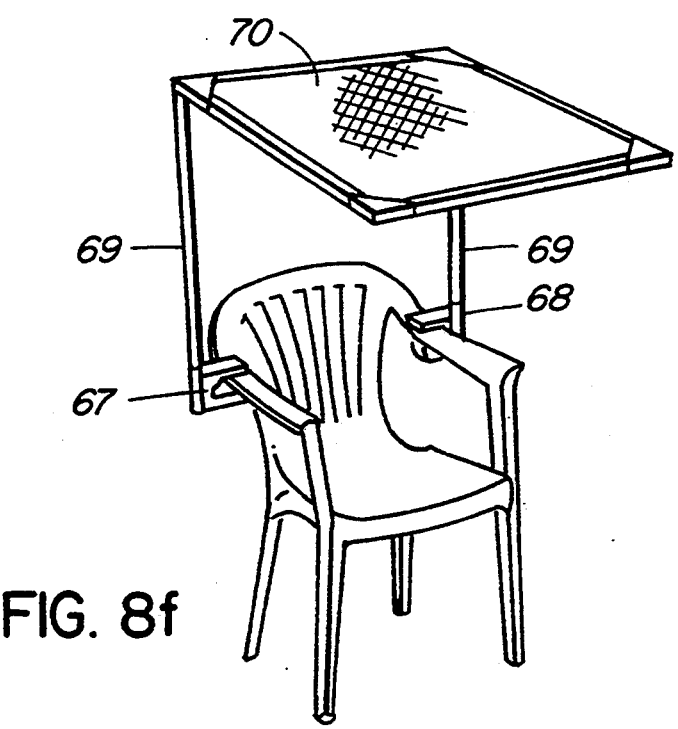
FIG. 8f is a perspective view of an awning mounted on a chair by a clamp in accordance with the invention.

The second section includes holder 41 which is mounted on body 50 having teeth 51 to engage teeth 49. A wing nut 52 is mounted on threaded shaft 53 so as to clamp teeth 49 and 51 into engagement or to permit pivotal movement of section 2 with respect to section 1 about a horizontal axis for a variety of positions of holder 41. In the embodiment illustrated in FIGS. 6 and 7 the umbrella or other article supported by the holder cannot pass through holder 41 because of the location of wing nut 52. This embodiment will therefore be particularly suitable for supporting a tray as illustrated in FIGS. 8(a) or 8(c) but can be used with a small umbrella as shown in FIG. 8(b). It will however be appreciated that if desired holder 41 can be located laterally of the wing nut to permit the shaft of the umbrella to pass unimpeded down through the holder.

FIG. 8 illustrates applications of this invention. In FIG. 8(a) what is known as a "resin" chair 60 has a tray 64 attached to it by a clamp in accordance with this invention. FIG. 10(b) shows a chair 60 to which umbrella shaft 62 has been secured by a clamp 63 in accordance with the invention. FIG. 8(c) shows that tray 64 can be secured to chair 60 in a frontal position by clamp 65. FIG. 8(d) is a detail view of the top side of tray 64 showing a glass holder recess 65. FIG. 8(e) shows the underside of tray 64 including glass holder 65 and a stub 66 to be attached to the holder of a clamp in accordance with the invention. FIG. 8(f) shows a pair of clamps 67 and 68 to be attached to the side of a chair to support rods 69, which in turn support awning 70.

It will be noted from FIG. 10 that a clamping device in accordance with this invention can readily be attached in a variety of locations on the arms or elsewhere of outside furniture of the type illustrated.

The embodiments of the invention in which an exclusive property or privilege is claimed are defined as follows:

1. A clamping device comprising a main body including a barrel and a first clamping arm extending laterally in one direction from a first end of said barrel; a second clamping arm pivotally mounted at a second end of said barrel and adapted to cooperate with the first clamping arm to engage an article upon which the clamping device is to be mounted; a holder extending laterally from said first end of said barrel in a direction other than said one direction; means for mounting said holder on said barrel to provide a position permitting pivotal movement with respect to the barrel and a position in which the holder is locked with respect to the barrel spring means within the barrel acting to bias the mounting means to a locked position while permitting movement of the mounting means to the position permitting pivotal movement; a cam follower at said other end of the barrel and a cam on the second clamping arm to cooperate with the cam follower to bias the second clamping arm to closed position.

2. A clamping device as in claim 1 in which said spring means bears on the cam follower to urge it against the cam.

3. A clamping device as in claim 1 where the holder and main body are each provided with locking teeth for mutual engagement to provide said position in which the holder is locked.

4. The clamping device as in claim 1, further comprising a tray with an underside stub adapted to cooperate with said holder.

5. The clamping device as in claim 1, further comprising an umbrella with a shaft adapted to cooperate with said holder.

6. The clamping device as in claim 1, further comprising an awning with a support rod adapted to cooperate with said holder.

7. A clamping device comprising a clamp with a recess and a holder; a mounting portion for said holder telescopically received in the recess in the clamp and having a first position permitting pivotal movement of the holder and a second position in which the holder is locked to prevent pivotal movement; and a spring with a locking button acting on the mounting portion normally to retain it in the first position in which said mounting portion has a conically shaped surface with its narrow diameter close to the holder, and said spring is a compression spring extending laterally from the mounting portion and acting to urge the locking button against the conically shaped surface.

8. A clamping device as in claim 7 in which teeth are provided on the holder and in the clamp which engage to lock the holder in said second position with the holder at a desired orientation.

9. A clamping device comprising a main body including a barrel and a first clamping arm extending laterally in one direction from a first end of said barrel; a second clamping arm pivotally mounted at a second end of said barrel and adapted to cooperate with the first clamping arm to engage an article upon which the clamping device is to be mounted; a holder extending laterally from said first end of said barrel in a direction other than said one direction; means for mounting said holder on said barrel to provide a position permitting pivotal movement with respect to the barrel and a position in which the holder is loced with respect to the barrel, spring means within the barrel acting to bias the mounting means to a locked position while permitting movement of the mounting means to the position permitting pivotal movement, said mounting means is telescopically received in a recess in the barrel and has a conically shaped surface with its narrow diameter close to the holder; a cam follower at said other end of the barrel and a cam on the second clamping arm to cooperate with the cam follower to bias the second clamping arm to closed position.

* * * * *